April 1, 1952    W. A. FLEISCHER    2,591,144
RESILIENT SUPPORT FOR TRACTOR SEATS
Filed July 19, 1947

INVENTOR.
William A. Fleischer
BY Arthur H. Sturges
Attorney

Patented Apr. 1, 1952

2,591,144

UNITED STATES PATENT OFFICE 2,591,144

RESILIENT SUPPORT FOR TRACTOR SEATS

William A. Fleischer, Grand Island, Nebr., assignor to Fleischer-Schmid Corporation, Columbus, Nebr.

Application July 19, 1947, Serial No. 762,088

3 Claims. (Cl. 155—54)

1

This invention relates to seats for motor vehicles and particularly for vehicles traveling over rough terrain.

It is well-known that it is very uncomfortable to drive tractors and similar vehicles over rough fields because of what is known as "seat spanking" from the up and down motion of the tractor. In addition, when tractors are traveling around the sides of hills and are transversely inclined, the driver is subjected to a fatiguing back strain, which is dangerous to health when continued over long periods of time.

It is therefore an object of the invention to provide a resilient support for the seats of tractors and the like which is adapted to stop jarring, tossing and "seat spanking," by absorbing the rebound action of a seat during travel over bumpy fields.

A further object of the invention is to provide a seat support which tends to maintain a seat level during travel across the sides of hills for avoiding what has been referred to as "slant ride."

Another object of the invention is to provide a seat support as described, the resiliency of which is adjustable.

Still other objects of the invention are to provide a seat support as described having adjustable and also optional level-seeking action.

Yet another object of the invention is to provide a seat support adapted to absorb the quick shocks or bumps common in high speed equipment.

Other and still further objects and advantages will become apparent from the following detailed description of a preferred embodiment thereof.

Figure 1:
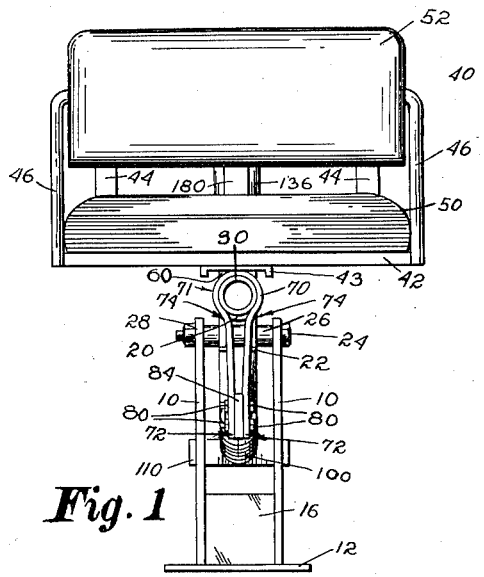
Figure 1 is a frontal elevation of a tractor seat and support of this invention.

The tractor seat support of this invention includes a mounting composed of two, parallel, elongated, vertically disposed, spaced apart plates, 10. The latter are secured at their lower ends to a normally horizontal plate 12 and the latter is provided with a plurality of vertical bolt holes 14 by means of which the plate may be secured in a horizontal position to the frame of a tractor or other vehicle.

2

A reinforcing plate 16 is vertically disposed between the lower ends of the plates 10 and is welded or otherwise secured to the plates 10 and the plate 12.

The plates 10 are disposed in vertical planes and preferably slant rearwardly from the lower ends to their upper ends. The plates 10 are pivotally attached to a normally horizontal bearing sleeve 20 at their upper ends by means of two vertically disposed downwardly extending tabs 22, which are secured to the sleeves 20 at their upper ends; and a bolt 24 is provided for extending through suitable apertures in the upper ends of the plates 10. The bolt 24 also extends through a suitable tubular bearing 26 and the latter is held in place between the plates 10 by means of the bolt 24 and a nut 28.

The tabs 22 are provided with apertures for receiving the tubular bearing 26 in such a manner that the sleeve 20 is free to rotate or pivot in a vertical plane about the bolt 24. The sleeve 20 is thereby mounted so that its axis is disposed longitudinally of a vehicle to which the seat may be attached.

A seat supporting member 30, preferably of tubular construction is rotatably received within the sleeve 20 providing a mounting member for the seat, and the seat is thereby mounted for swinging movement in a vertical plane and rotatably secured to the plates 10 for oscillating movements about an axis disposed longitudinally of the vehicle. The sleeve 20 is provided with a set-screw 32 threadedly disposed in a normally vertical aperture in the rearward end of the underside of the sleeve 20. The set-screw or bolt 32 is further received in a threaded extension 34, attached to the lower side of the sleeve 20, for providing the set-screw 32 with a good grip on the sleeve 20, so that at desired times when the set-screw 32 is tightened, the tubular seat mounting member 30 will be prevented from rotating in the sleeve 20.

On the rearward portion of the seat support or mounting member 30 a seat, generally indicated at 40, is mounted thereupon. The seat 40 includes bottom frame members 42 disposed in a rectangular configuration; a rigid longitudinal bottom frame support 43 attached to the members 42; back frame members 44 normally disposed in a vertical plane and secured at right angles to the normally horizontal bottom frame members 42. A back-rest cushion 52, preferably of construction similar to that of the seat, is vertically disposed against the back frame member 44. The seat 50 and back-rest 52 may be of uncushioned steel, if desired. Also, the remainder or seat support portion of the invention may be made and sold without a seat 40 attached, and customers may attach their own seats thereto.

A bolt 56 is either disposed through, or attached to, the seat bottom frame support 43 and extends downwardly through apertures disposed through the tubular seat mounting member 30 at a right angle with respect to the longitudinal length thereof. The bolt 56 is normally vertically disposed and is provided with a nut 58 on the lower end thereof, for rigidly securing the seat 40 to the seat mounting member 30.

Figure 4:
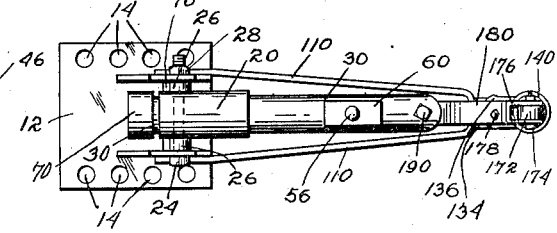
Figure 4 is a top plan view of the seat support of Figure 1, the seat being removed therefrom.

Between the seat mounting member 30 and the frame support 43, a bearing member 60 is provided. The bearing member 60 is of rectangular shape in top plan view, as shown in Figure 4, and is provided with an aperture therethrough for receiving the bolt 56. The member 60 is provided with downwardly extending feet, not shown, which are adapted to engage and clamp against the top of the rounded upper side of the mounting member 30, to relieve twisting strain on the bolt 56.

At the forward end of the seat mounting member 30 and forwardly of the pivotal mounting provided by the bolt 24 with respect to the seat 40, a bracket 70 is secured to the seat mounting member 30. The bracket 70 is preferably formed of a single bar, having oppositely disposed substantially parallel ends 72 providing a vertically disposed arm.

The sections 74 of the arm 70 which are disposed between the ends 72 of the arm 70 and the wrapped, almost circular-shaped, center section 71 thereof, are each respectively bent toward each other inwardly of straight lines drawn between the ends 72 of the arm 70 and those farthest spaced apart bar portions of the appoximately circular section 71 of the arm 70.

As thus described, at times when the lower ends 72 of the arm 70 are drawn together by means of suitable bolts 80, disposed through their lower ends, the bar 70 will be rigidly clamped about the seat mounting bar 30.

Figure 2:
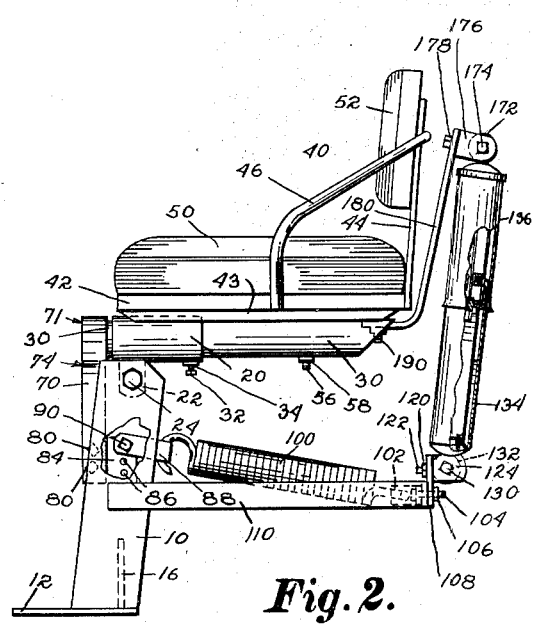
Figure 2 is a side elevation of the tractor seat and support as shown in Figure 1, certain portions of the mounting and of the shock absorber being broken away.
Figure 3:
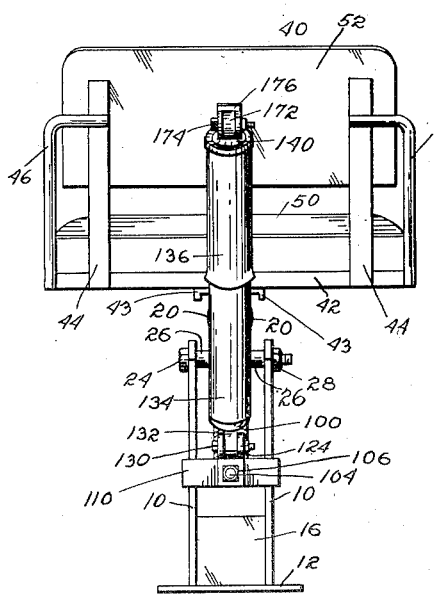
Figure 3 is a rear elevation of the seat and support shown in Figure 1.

The bracket bar or arm 70 extends downwardly, from the seat mounting member or support 30. At its lower end, the bracket bar 70 is secured, by means of the bolts 80, to a vertically disposed adjustment plate 84, which latter is held between and extends rearwardly of the lower ends 72 of the bar 70. As best shown in Figure 2, the rearward end of the adjustment plate 84 is provided with a vertically disposed row of spaced apertures 86 to a selected one of which a U-shaped clevis 86 is secured, by means of a suitable bolt 90.

A suitable resilient means such as a coiled tension spring 100 is provided, having a hook at its forward end disposed through the clevis 88 for securing the spring 100 to the adjustment plate 84. The spring 100 is normally disposed at an angle to the mounting member 30 and at its hooked rearward end, the spring 100 is secured to a second clevis 102, which latter is adjustably secured by means of a bolt 104 and nut 106 to the lower aperture of a vertically disposed attachment plate 108. The plate 108 is in turn welded or otherwise suitably secured to a normally horizontally disposed extension bar 110. The latter is of a U-shape and is welded or otherwise suitably secured at its forward ends to the plates 10. The sides of the extension bar 110 are sufficiently spaced apart for permitting the spring 100 to be received therebetween.

The attachment plate 108 extends upwardly past the extension bar 110 and transversely of the latter, and is provided with a second aperture in its upper end for receiving a bolt 120, which latter is provided with a nut 122 for holding a third U-shaped clevis to the attachment plate 108. The oppositely disposed arms of the clevis 124 extend rearwardly, and a bolt 130 is provided extending through apertures in the arms of the clevis 124. The bolt 130 is for the purpose of pivotally attaching the clevis of the plate 108 to an apertured ear 132 on the lower end of casing 134 of the shock absorber.

The shock absorber is preferably of the hydraulic type having the lower casing or cylinder 134 with an upper cylinder 136 slidably mounted thereon, and the lower cylinder 134 is pivotally mounted in the clevis 124 with the bolt 130, as shown in Figure 2. The cylinders are provided with conventional pistons, valves, and pressure regulating devices.

The upper end 140 of the shock absorber is provided with an apertured ear 172 which is secured by means of a bolt 174 to a clevis 176. The clevis 176 is in turn secured by means of a bolt 178 to a draw bar or arm 180, which latter is substantially vertically disposed, and slightly rearwardly inclined. The lower end of the draw bar 180 is bent forwardly and at an almost right angle with respect to the remainder of the bar; and is attached to the rearward end of the seat mounting member 30 by means of a bolt 190.

In operation, at times when the vehicle, to which the seat and seat mounting member of this invention are attached, travels over rough fields, causing up and down vertical motions of the vehicle, the jarring and tossing, caused thereby, is absorbed by the shock absorber, the operation of which is as has been previously described. This is for the reason that downward motions of the seat are transferred to the draw bar 180, which, in turn, pulls downwardly upon the upper casing 136 of the shock absorber.

The shock absorber is again returned to its original length through the action of the spring 100, which pulls rearwardly upon the lower end of the bracket bar 70. This, in turn, pulls downwardly upon the forward end of the seat-mounting member 30, causing the latter to pivot about the bolt 24. The rearward end of the seat mounting member 30 will then swing upwardly, forcing the draw bar 180 upwardly and in turn causing the shock absorber to be gradually elongated to its original position.

As thus described, it will be seen that the shock absorber not only absorbs a downward motion of the seat 40, but also absorbs an upward rebound of the seat, under the urge of the spring 100. It will also be seen that the vertical action of the seat 40 may be regulated by adjusting the nut 106 on the bolt 104, to regulate the tension of the spring 100.

At times when the vehicle, to which the seat of this invention is attached, is traveling over side hills so that the vehicle is transversely inclined, the seat 40 will tend to exert a twisting action upon the seat mounting member 30, and the latter will, in turn, rotate within the sleeve 20. Such rotation will be permitted by the expansion of the spring 100. At the same time, the tension of the spring 100 will prevent such rotation from being excessive.

Such stretching of the spring 100 is regulatable for adjustment to the weights of different riders through the insertion of the bolt 90 through different ones of the apertures 86.

The seat support of this invention may be used without the shock absorber. This is particularly possible when draglines are being used, since the latter are slow moving and the shock absorbing cylinder is particularly adapted for absorbing quick shocks on high speed equipment.

As thus described, it will be seen that this invention has provided a seat-support, for attachment to vehicles, which tends to maintain a seat level during travel across the sides of hills and which is adapted to cushion the rider against the vertical motions caused by bumpy hills, fields and the like.

From the foregoing description, it is thought to be obvious that a resilient support for tractor seat constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. A seat mounting comprising a stand having upwardly extended spaced parallel plates, a seat having a centrally positioned longitudinally disposed tubular mounting member on the under surface, an arm extended downwardly from the forward end of said tubular mounting member, a bearing sleeve positioned on the forward end of the said tubular mounting member, means pivotally mounting the said bearing sleeve between the upper ends of the said parallel plates, horizontally disposed bars extended rearwardly from the said parallel plates, resilient means connecting the rear ends of the horizontally disposed bars to the lower end of the arm extended downwardly from the tubular mounting member of the seat, a centrally positioned draw bar extended upwardly from the back of the seat, and a pair of telescoping cylinders having resilient compressible means therein connecting the upper end of the draw bar extended upwardly from the back of the seat to the rear ends of the said horizontally disposed bars.

2. In a seat mounting, the combination which comprises a stand having spaced upwardly extended parallel plates thereon, a seat having a centrally positioned longitudinally disposed tubular mounting member on the under surface, an arm extended downwardly from the forward end of said tubular mounting member, a bearing sleeve also positioned on said tubular mounting member and spaced from the downwardly extended arm, means pivotally mounting the bearing sleeve between the upper ends of the said parallel plates, horizontally disposed bars extended rearwardly from the said parallel plates, a spring connected to the rear ends of the horizontally disposed bars and lower end of the arm extended downwardly from the tubular mounting member of the seat, a centrally positioned draw bar extended upwardly from the back of the seat, and a pair of telescoping cylinders having compressible means therein connected to the upper end of the draw bar extended upwardly from the back of the seat and to the rear ends of the horizontally disposed bars extended rearwardly from the said parallel plates.

3. In a seat mounting, the combination which comprises a stand having spaced upwardly extended parallel plates thereon, a seat having a centrally positioned longitudinally disposed tubular mounting member on the under surface, an arm extended downwardly from the forward end of said tubular mounting member, a bearing sleeve having tabs extended downwardly therefrom positioned on the forward end of said tubular mounting member, a set screw in said bearing sleeve for retaining the sleeve in position on the tubular mounting member, a transversely positioned horizontally disposed shaft extended through the upper ends of the parallel plates and tabs of the bearing sleeve for pivotally mounting the seat in the stand, horizontally disposed bars extended rearwardly from the lower parts of the said parallel plates to a point beyond the back of the seat, a spring connecting the rear ends of the horizontally disposed bars to the lower end of the arm extended downwardly from the said tubular mounting member, a centrally positioned draw bar extended upwardly from the back of the seat, and a pair of telescoping cylinders having compressible means therein connecting the upper end of the draw bar on the back of the seating to the rear ends of the horizontally disposed bars extended from the said parallel plates.

WILLIAM A. FLEISCHER.

REFERENCES CITED

The following references are of record in the file of this patent:

UNITED STATES PATENTS

| Number | Name | Date |
| --- | --- | --- |
| 1,254,963 | Baker | Jan. 29, 1918 |
| 1,498,282 | Kauffmann | June 17, 1924 |
| 2,284,352 | Zank | May 26, 1942 |

FOREIGN PATENTS

| Number | Country | Date |
| --- | --- | --- |
| 217,011 | Great Britain | June 12, 1924 |
| 410,413 | Great Britain | May 17, 1934 |